(12) United States Patent
Kim

(10) Patent No.: US 7,344,292 B2
(45) Date of Patent: Mar. 18, 2008

(54) EDGE-TYPE BACKLIGHT UNIT

(75) Inventor: Bum Jin Kim, Gyunggi-do (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 0 days.

(21) Appl. No.: 11/785,283

(22) Filed: Apr. 17, 2007

(65) Prior Publication Data

US 2007/0242474 A1   Oct. 18, 2007

(30) Foreign Application Priority Data

Apr. 17, 2006   (KR) ...................... 10-2006-0034571

(51) Int. Cl.
*F21V 8/00* (2006.01)
(52) U.S. Cl. ...................... 362/612; 362/600; 362/608; 362/611; 362/612; 362/555; 349/61; 349/65
(58) Field of Classification Search ...................... None
See application file for complete search history.

(56) References Cited

U.S. PATENT DOCUMENTS

| | | | | |
|---|---|---|---|---|
| 5,751,383 | A * | 5/1998 | Yamanaka | 349/13 |
| 6,608,614 | B1 * | 8/2003 | Johnson | 345/102 |
| 7,220,039 | B2 * | 5/2007 | Ahn et al. | 362/612 |
| 2001/0035835 | A1 * | 11/2001 | Riley et al. | 341/143 |
| 2002/0172039 | A1 * | 11/2002 | Inditsky | 362/231 |
| 2003/0007344 | A1 * | 1/2003 | Parker | 362/31 |
| 2003/0076669 | A1 * | 4/2003 | Itoh et al. | 362/31 |
| 2004/0061814 | A1 * | 4/2004 | Kim et al. | 349/65 |
| 2004/0227869 | A1 * | 11/2004 | Martynov et al. | 349/61 |
| 2005/0001537 | A1 * | 1/2005 | West et al. | 313/500 |
| 2005/0088403 | A1 * | 4/2005 | Yamazaki | 345/102 |
| 2006/0056201 | A1 * | 3/2006 | Chang et al. | 362/631 |
| 2007/0091227 | A1 * | 4/2007 | Wang et al. | 349/65 |

FOREIGN PATENT DOCUMENTS

| | | |
|---|---|---|
| JP | 2001-222904 | 8/2001 |
| KR | 10-2004-0093533 A | 11/2004 |

OTHER PUBLICATIONS

Korean Office Action, with English Translation, issued in corresponding Korean Patent Application No. 10-2006-0034571, dated on May 17, 2007.

* cited by examiner

*Primary Examiner*—Sandra O'Shea
*Assistant Examiner*—Danielle Dunn
(74) *Attorney, Agent, or Firm*—McDermott Will & Emery LLP

(57) ABSTRACT

An edge-type backlight unit having a plurality of rows of red, blue and green LEDs to provide a light source. In the backlight unit, a light guide plate has a light incidence part formed on a side surface thereof to receive light, the light guide plate inducing the light from the light incidence part to be emitted through a top surface of the light guide plate. A light source is disposed near the light incidence part of the light guide plate, and includes a plurality of red, green and blue light emitting diodes along the light incidence part. The light emitting diodes are grouped into at least three rows according to color. Here, the row of the green light emitting diodes is arranged most adjacent to the top surface of the light guide plate.

8 Claims, 4 Drawing Sheets

EDGE-TYPE BACKLIGHT UNIT

CLAIM OF PRIORITY

This application claims the benefit of Korean Patent Application No. 2006-34571 filed on Apr. 17, 2006 in the Korean Intellectual Property Office, the disclosure of which is incorporated herein by reference.

BACKGROUND OF THE INVENTION

1. Field of the Invention

The present invention relates to an edge-type backlight unit, more particularly, which has a plurality of arrays of red, blue and green LEDs to provide a light source.

2. Description of the Related Art

Development in the electronic device industry also has led to development in various kinds of small-sized display devices consuming less power, and image devices, computers, mobile telecommunication terminals using such display devices. A liquid crystal display (LCD) has emerged in line with this trend and drawn attention as a display device for monitors and mobile telecommunication terminals.

A liquid crystal panel of the LCD does not generate light on its own. Thus, typically the liquid crystal panel is equipped with a backlight unit including a light source for backlighting the liquid crystal panel and a light guide plate.

A cold cathode fluorescent lamp (CCFL) has been conventionally utilized as a light source of an LCD backlight. The CCFL may trigger environmental pollution due to use of a mercury gas. Also, the CCFL is low in response rate and color reproducibility, and inadequate for reducing the weight and size of the LCD panel.

In contrast, a light emitting diode (LED) is environment-friendly and can respond fast with several nano seconds, thus effective in video signal stream. Moreover, the LED can be impulsively driven, reproduce colors by 100% or more and arbitrarily change brightness and color temperature by adjusting a light amount of red, green and blue LEDs. Also, the LED carries advantages leading to a lighter weight and smaller sized LCD panel. Thus the LED is actively adopted as a backlight source of the LCD panel.

In general, the LCD backlight employing the LEDs includes an edge-type backlight and a direct-type backlight depending on location of a light source. In the former, a light source is shaped as an elongated bar and disposed at a side of a light guide plate to irradiate light onto the LCD panel. In the latter, a surface light source is substantially identical in size to the LCD panel and disposed under the LCD panel to directly irradiate light onto the LCD panel.

FIG. 1 is a schematic view illustrating a conventional edge-type backlight unit 100 using a light emitting diode and a light source 110. As shown in FIG. 1, the edge-type backlight unit 100 includes a light guide plate 121 having a light incidence part 121 formed on a side surface thereof and the light source 110 including light emitting diodes (LED)s 112 arrayed in rows on a board 111.

The LEDs 112 are arrayed in rows on the board 111 in an order of red-green-blue to irradiate light onto the light incidence part 121 of the light guide plate 130. Light emitted from the rows of the red, green and blue LEDs 112 enters the light incidence part 121 of the light guide plate 120 to be combined together into white light. The white light is supplied to a liquid crystal panel (not illustrated) disposed over the light guide plate 120.

However, the conventional LED arrangements require high-power LED chips to produce white light. These LED chips greatly differ in emission light, thereby not forming uniform white light on an overall LCD screen. This accordingly causes partial color stains. Also, the conventional LED arrangements result in color stains due to imperfect light mixture in the liquid crystal panel in the vicinity of the LEDs, thereby degrading an overall image quality of the LCD device.

In addition, a reflective film of the light guide plate should be patterned more elaborately to reduce such color stains.

SUMMARY OF THE INVENTION

The present invention has been made to solve the foregoing problems of the prior art and therefore an aspect of the present invention is to provide a light source which generates uniform white light and an edge-type backlight unit reduced in color stains.

According to an aspect of the invention, the edge-type backlight unit includes a light guide plate having a light incidence part formed on a side surface thereof to receive light, the light guide plate inducing the light from the light incidence part to be emitted through a top surface of the light guide plate; and a light source disposed near the light incidence part of the light guide plate, and including a plurality of red, green and blue light emitting diodes along the light incidence part, the light emitting diodes grouped into at least three rows according to color, wherein the row of the green light emitting diodes is arranged most adjacent to the top surface of the light guide plate.

According to an embodiment of the invention, the red, green and blue light emitting diodes are arranged in a matrix.

According to another embodiment of the invention, the light emitting diodes are grouped into three rows according to color. The rows of the red, green and blue light emitting diodes are arranged sequentially in an order of green-red-blue or green-blue-red in a direction perpendicular to a plane of the top surface of the light guide plate.

According to further another embodiment of the invention, the light source includes one row of the red light emitting diodes, two rows of the green light emitting diodes and one row of the blue light emitting diodes. The light source includes the rows of the red, green and blue light emitting diodes arranged sequentially in a direction perpendicular to a plane of the top surface of the light guide plate, in an order selected from the group consisting of green-red-green-blue, green-red-blue-green, green-green-red-blue, green-green-blue-red, green-blue-red-green and green-blue-green-red.

According to further another embodiment of the invention, the light source is implemented with a plurality of light emitting diode packages each including two of the red, green and blue light emitting diodes. The two light emitting diodes of the light emitting diode package are arranged in a direction perpendicular to a plane of the light guide plate.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

Figure 1:
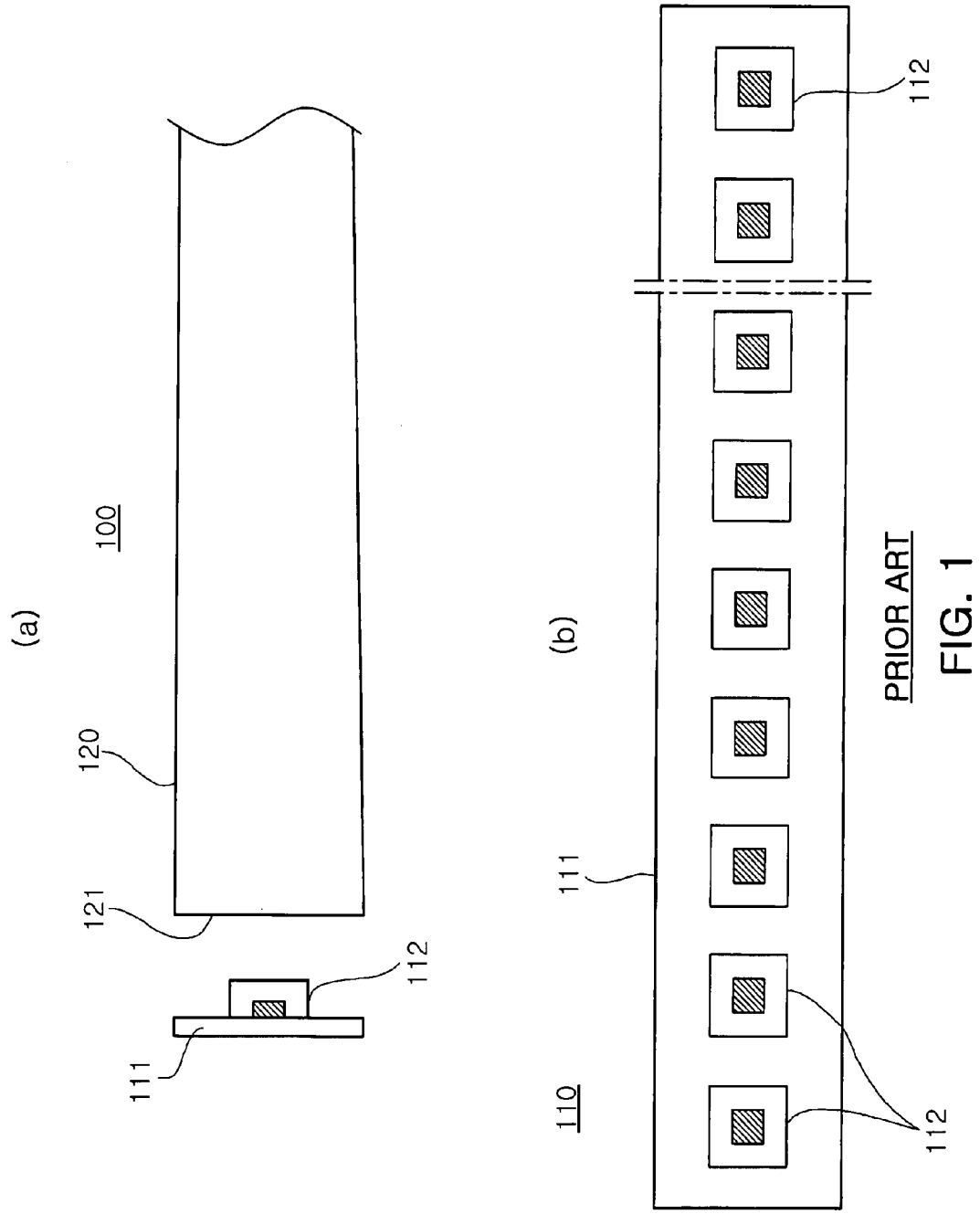
FIG. 1 is a schematic view illustrating a conventional edge-type backlight unit using a light emitting diode and a light source.

Exemplary embodiments of the present invention will now be described in detail with reference to the accompanying drawings. The invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the shapes and dimensions may be exaggerated for clarity, and the same reference signs are used to designate the same or similar components throughout.

Figure 2:
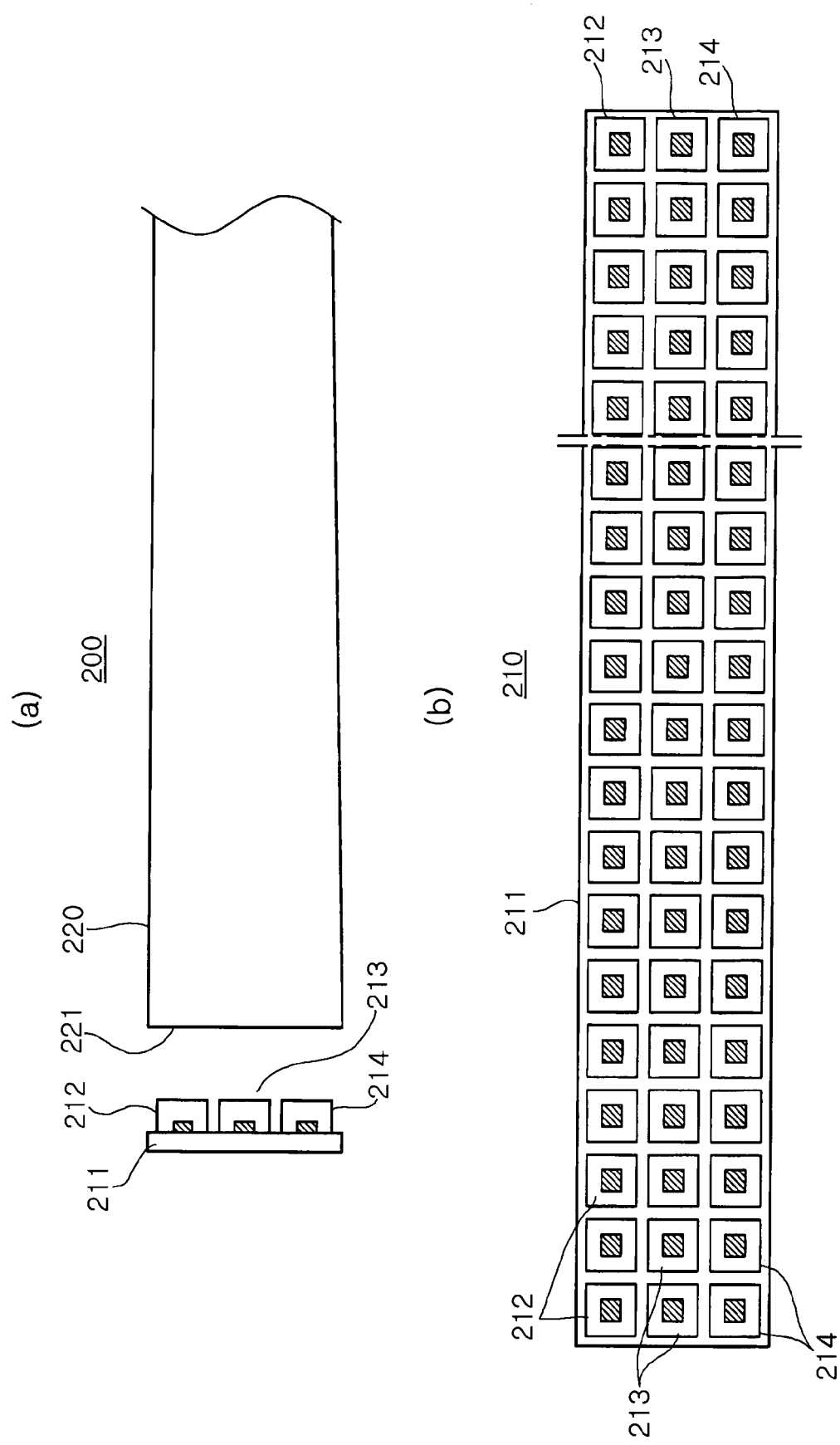
FIG. 2 is a schematic view illustrating an edge-type backlight unit using a light emitting diode and a light source of the invention.

FIG. 2 is a schematic view illustrating an edge-type backlight unit 200 using a light emitting diode and a light source 210 according to the invention.

As shown in FIG. 2, the edge-type backlight unit 200 of the invention includes a light guide plate 220 and the light source 210.

The light guide plate 220 is rectangular-shaped, and a side surface thereof forms a light incidence part 221 for receiving light. The light guide plate 220 guides the light from the light incidence part toward a liquid crystal panel.

The light source 210 has a plurality of red, green and blue LEDs 213, 212 and 214 arranged in a matrix of rows and columns on a board 211. The green LEDs 212 are grouped into a row along a length direction in an uppermost part of the board 211, thereby forming a green LED row. Also, the red LEDs 213 are grouped into a row right under the green LED row, thereby forming a red LED row. The blue LEDs 214 are grouped into a row right under the blue LED row, thereby forming a blue LED row. In FIG. 2, the three-colored LED rows are arranged sequentially in an order of green-red-blue but alternatively may be arranged in a different order.

The board 211 typically adopts a metal core PCB (MCPCB) which is used for an LED backlight. The MCPCB is a PCB having an insulating plate formed on upper and lower surfaces of a core made of metal such as Al. The MCPCB can radiate heat easily when a plurality of LEDs mounted generate a significant amount of heat.

As described, the light source 210 has the LEDs 212, 213 and 214 arranged in a matrix of rows and columns on the board 211. Here, the light source 210 is disposed along the light incidence part 221 formed on the side surface of the light guide plate 220 and the green LED row is located in the uppermost part of the light guide plate 220.

The light guide plate 220 is rectangular-shaped and made of transparent acryl. The light incidence part 221 is defined by the side surface of the light guide plate 220, and disposed in the vicinity of the light source. The light guide plate 220 receives light generated from the LEDs 212, 213 and 214 of the light source 210 and disperses the light onto an entire top surface thereof. A reflective film (not illustrated) is affixed onto an underside surface of the light guide plate 220 to direct the light only toward the top surface of the light guide plate 220.

As described above, a plurality of diffusing plates and prism plates are disposed above the light guide plate 220 to uniformly distribute light emitted from the light guide plate and guide the light into an image forming area of the liquid crystal panel.

When the light enters the light guide plate through the light incidence part 221 of the light guide plate 220, some portion of the light incident onto the underside surface of the light guide plate 220 is guided or reflected by the reflective film underlying the light guide plate 220 toward the liquid crystal panel (not illustrated) disposed on the light guide plate 220. Meanwhile, in this case, other portion of the light becomes incident on the top surface of the light guide plate 220, and is reflected from the top surface of the light guide plate 220 and directed toward the underside surface of the light guide plate 220. Then, the light is guided again by the reflective film underlying the light guide plate 220 toward the liquid crystal panel.

When the light is directed to the top surface of the light guide plate 220, a portion of the light incident onto the top surface near the light incidence part 221 is not reflected, but passes through the top surface while being refracted thereby. The portion of light transmitted without being reflected is irradiated onto the liquid crystal panel, with stronger brightness than the reflected light, thus causing color stains. This tends to degrade the image quality of the LCD.

These color stains are caused more by the LEDs in a closer proximity to the top surface of the light guide plate 220, that is, the light from these LEDs reaches the top surface of the light guide plate 220 along a relatively shorter path. Accordingly, a less amount of the light generated from the LEDs 212 in the uppermost part of the light source 210 should propagate through the top surface of the light guide plate 220 in order to reduce color stains.

When it comes to wavelengths of red, green and blue light, the red light is longest in the wavelength and the blue light is shortest. A critical angle where total reflection occurs is proportional to the wavelength. That is, a longer wavelength means a greater critical angle and a shorter wavelength means a smaller critical angle. Thus, the red light has a greatest critical angle and the blue light has a smallest critical angle.

Accordingly, in a case where the blue LEDs are disposed in the uppermost part of the light source, the blue light passes through the top surface of the light guide plate 220 in a greater amount than the green or red light emitted from the green or red LEDs. Therefore, it is not preferable to dispose the blue LEDs in the upper part of the light source 210.

Meanwhile, the red light generated from the red LEDs passes through the top surface of the light guide plate 220 in a smaller amount than the green or blue light generated from the green or blue LEDs. However, the red light is more visible than the green and blue light so that even a meager amount of the red light can produce color stains. Thus it is not preferable to dispose the red LEDs in the uppermost part of the light source 210.

As a result, it is preferable that the green LEDs are disposed in the uppermost part of the light source 210. This LED arrangement significantly lowers color stains, enabling a high-quality image to be viewed. Also, less color stain obviates a need for developing new elaborate patterns for the reflective film of the light guide plate. In place thereof, a conventional reflective film pattern for a CCFL can be adopted, which thus entails no additional developmental costs.

Moreover, the edge-type backlight unit 200 of the invention employs a greater number of LEDs, which are however smaller sized and consume less power than the conventional one. The LEDs consuming less power are more stable than the conventional high-power LEDs, exhibiting relatively smaller difference in emission light and thus ensuring uniform color. This also downscales the size of the LEDs, thereby decreasing thickness of the light source and an overall product size.

Referring to FIG. 2, the light source 210 includes three arrays of LEDs arranged in a matrix of rows and columns. That is, the light source 210 has one green LED row of the green LEDs 212, one red LED row of the red LEDs 213, and one blue LED row of the blue LEDs 214 arranged therein. However, the invention is not limited to the three rows of the LEDs. The light source 210 may include at least four LED rows having at least one LED row for each color. But the invention is not limited to this matrix configuration shown in FIG. 2. Alternatively, the red, green and blue LED rows may be arranged in a different order.

Figure 3:
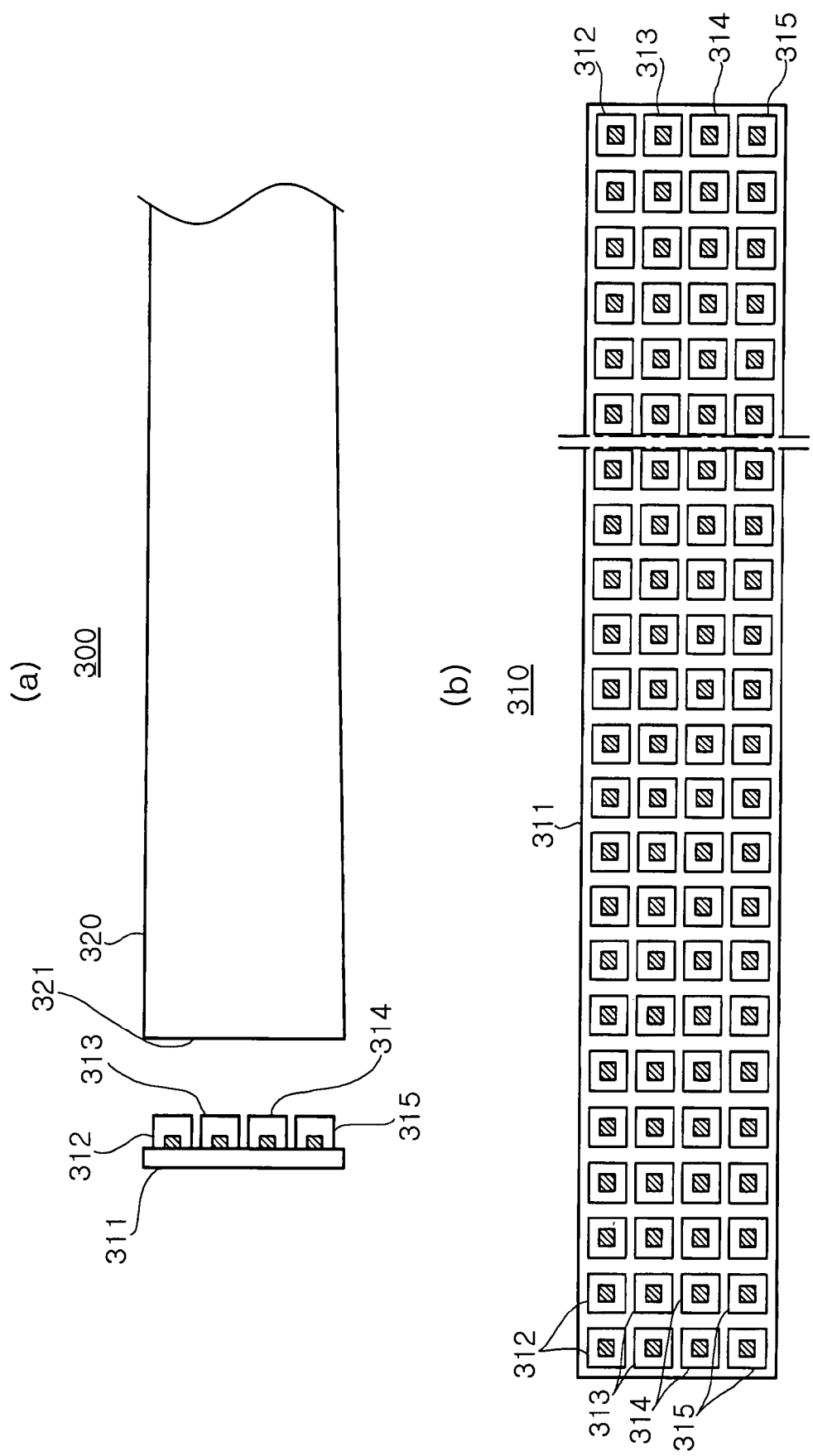
FIG. 3 is a schematic view illustrating a backlight unit having four rows of light emitting diodes and a light source.

FIG. 3 is a schematic view illustrating a backlight unit 300 including four LED rows and a light source 310 according to an embodiment of the invention.

Referring to FIG. 3, the backlight unit 300 includes a light guide plate 320 having a light incidence part 321 formed therein and the light source 310 having a plurality of red, green and blue LEDs 312, 313, 314 and 315 arrayed on a board 311.

In the light source 310, the green LEDs are grouped into two rows along the light incident part 321 of the light guide plate 320. Also, the red LEDs 313 are grouped into a row along the light incidence part 321 of the light guide plate 320 and the blue LEDs 315 are grouped into a row along the light incidence part 321 of the light guide plate 320. These green, red and blue LED rows are arranged sequentially in an order of green-red-green-blue in a direction perpendicular to a plane of a top surface of the light guide plate 320.

In the backlight using the red, blue and green LEDs, red light from the red LEDs, blue light from the blue LEDs and green light from the green LEDs are combined together into white light to be irradiated onto a liquid crystal panel. High-quality white light requires a greater proportion of green light than the red or blue light. Thus, preferably, the green LED rows outnumber the red and green LED rows, respectively.

Referring to FIG. 3, in the light source 310, the red, green and blue LED rows are arranged sequentially in an order of green-red-green-blue in a direction perpendicular to a plane of the top surface of the light guide plate 320. But the invention is not limited thereto. The red, green and blue LED rows may be arranged sequentially in a direction perpendicular to a plane of the top surface of the light guide plate, in an order selected from the group consisting of green-red-blue-green, green-green-red-blue, green-green-blue-red, green-blue-red-green and green-blue-green-red.

Figure 4:
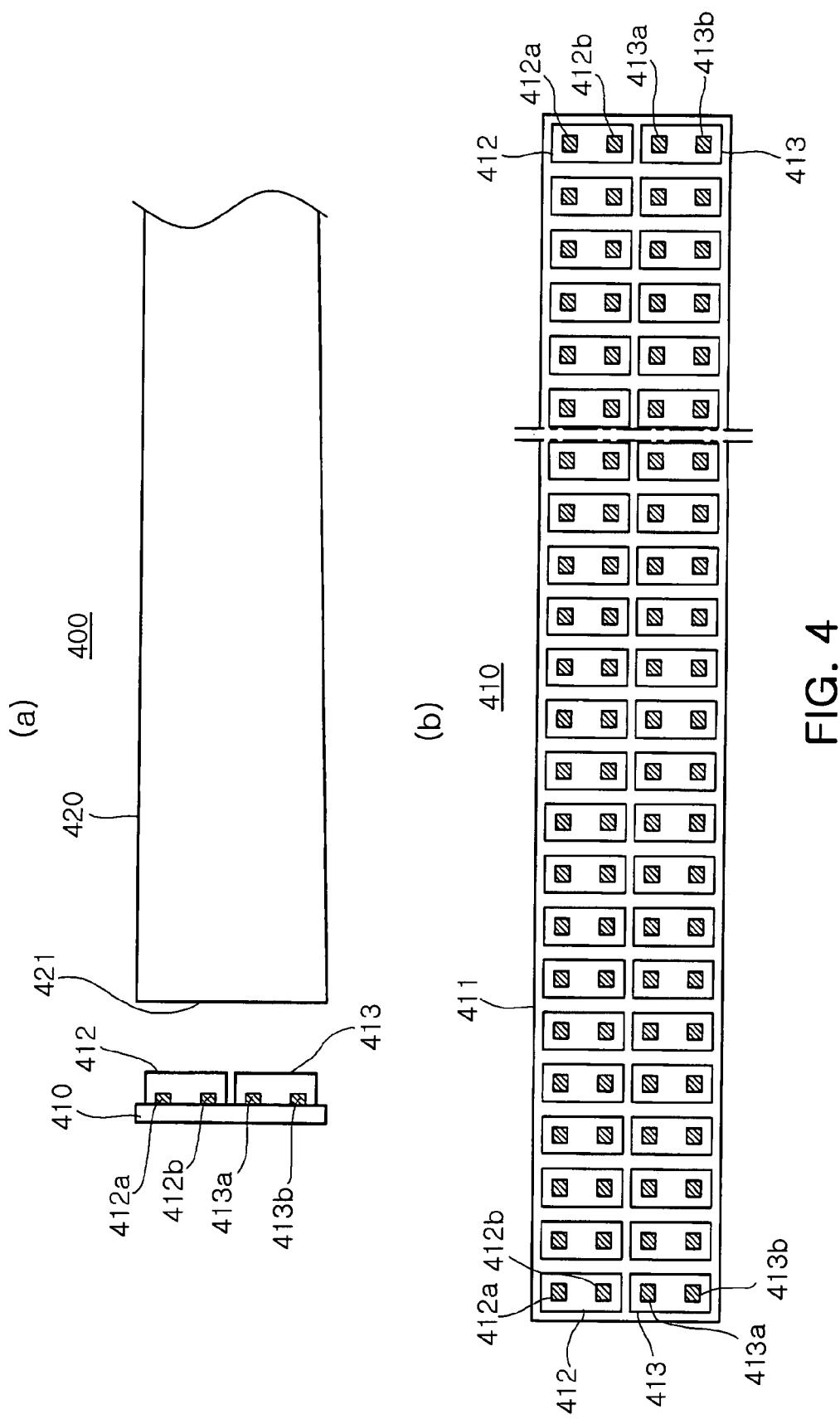
FIG. 4 is a schematic view illustrating a backlight unit including a plurality of LED packages, and a light source according to an embodiment of the invention.

FIG. 4 is a schematic view illustrating a backlight unit 400 including a plurality of LED packages and a light source 410 according to another embodiment of the invention.

As shown in FIG. 4, the light source 410 is implemented with the LED packages 412 and 413 each including two LEDs, that is, LEDs 412a and 412b, or LEDs 413a and 413b. The four LEDs 412a, 412b, 413a and 413b are arranged vertically along a light incidence part 421 of a light guide plate 420. Here, the vertically arranged LED packages are arranged in rows horizontally to form a matrix configuration of LEDs. That is, a board 411 is provided with the LED package 412 having the LEDs 412a and 412b disposed in first and second rows and the LED packages 413 having the LEDs 413a and 413b disposed in third and fourth rows to form the light source 410.

In a case where the light source 420 is fabricated using separate red, green and blue LEDs, the respective LEDs of each color should be mounted on a board separately, thus increasing production costs. Furthermore, it is not preferable to adopt the LED packages each including a plurality of LEDs. That is, the LED packages need to be replaced even when only one of the LEDs is found defective. Therefore, more preferably, the light source is implemented with the LED packages each including two of the LEDs.

Referring to FIG. 4, the two LEDs 412a, 412b and the two LEDs 413a, 413b, which are adjacent vertically to each other, constitute the LED packages 412 and 413, respectively. But the invention is not limited thereto. The LED packages may include the two LEDs adjacent horizontally to each other.

As set forth above, according to exemplary embodiments of the invention, low-power LEDs with small difference in emission light are adopted to reduce color stains.

Also, green LEDs are arranged in an uppermost part of a light source, thereby lessening color stains in an area in the vicinity of the backlight unit.

In addition, less color stain obviates a need for developing new patterns on a reflective film of a light guide plate, thereby saving development costs therefore.

While the present invention has been shown and described in connection with the preferred embodiments, it will be apparent to those skilled in the art that modifications and variations can be made without departing from the spirit and scope of the invention as defined by the appended claims.

What is claimed is:

1. An edge-type backlight unit comprising:
a light guide plate having a light incidence part formed on a side surface thereof to receive light, the light guide plate inducing the light from the light incidence part to be emitted through a top surface of the light guide plate; and
a light source disposed near the light incidence part of the light guide plate, and including a plurality of red, green and blue light emitting diodes along the light incidence part, the light emitting diodes grouped into at least three rows according to color,
wherein the row of the green light emitting diodes is arranged most adjacent to the top surface of the light guide plate.

2. The edge-type backlight unit according to claim 1, wherein the red, green and blue light emitting diodes are arranged in a matrix.

3. The edge-type backlight unit according to claim 1, wherein the light emitting diodes are grouped into three rows according to color.

4. The edge-type backlight unit according to claim 3, wherein the rows of the red, green and blue light emitting diodes are arranged sequentially in an order of green-red-blue or green-blue-red in a direction perpendicular to a plane of the top surface of the light guide plate.

5. The edge-type backlight unit according to claim 1, wherein the light source includes one row of the red light emitting diodes, two rows of the green light emitting diodes and one row of the blue light emitting diodes.

6. The edge-type backlight unit according to claim 5, wherein the light source includes the rows of the red, green and blue light emitting diodes arranged sequentially in a direction perpendicular to a plane of the top surface of the light guide plate, in an order selected from the group consisting of green-red-green-blue, green-red-blue-green, green-green-red-blue, green-green-blue-red, green-blue-red-green and green-blue-green-red.

7. The edge-type backlight unit according to claim 1, wherein the light source comprises a plurality of light emitting diode packages each including two of the red, green and blue light emitting diodes.

8. The edge-type backlight unit according to claim 7, wherein the two light emitting diodes of the light emitting diode package are arranged in a direction perpendicular to a plane of the top surface of the light guide plate.

* * * * *